(12) United States Patent
Magina et al.

(10) Patent No.: US 12,366,203 B1
(45) Date of Patent: Jul. 22, 2025

(54) TURBINE ENGINE HAVING A MULTICAVITY DAMPER

(71) Applicant: General Electric Company, Schenectady, NY (US)

(72) Inventors: Nicholas Arthur Magina, Saratoga Springs, NY (US); Fei Han, Clifton Park, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/664,924

(22) Filed: May 15, 2024

(51) Int. Cl.
F02C 7/00 (2006.01)

(52) U.S. Cl.
CPC ............ F02C 7/00 (2013.01); F05D 2260/96 (2013.01); F23R 2900/00013 (2013.01); F23R 2900/00014 (2013.01)

(58) Field of Classification Search
CPC .. F23R 2900/00013; F23R 2900/00014; F05D 2260/96; F02C 7/00; F02C 7/045; F02C 7/24; F02K 1/34; F02K 7/04
See application file for complete search history.

(56) References Cited

U.S. PATENT DOCUMENTS

| | | | |
|---|---|---|---|
| 6,009,705 A | 1/2000 | Arnott et al. | |
| 8,469,141 B2 | 6/2013 | Wang et al. | |
| 8,567,197 B2 * | 10/2013 | Mueller | F23M 20/005 60/725 |
| 8,733,496 B2 | 5/2014 | Ono et al. | |
| 9,604,438 B2 | 3/2017 | Lumbab et al. | |
| 10,228,134 B2 | 3/2019 | Tonon et al. | |
| 10,228,138 B2 | 3/2019 | Theuer et al. | |
| 11,514,878 B2 | 11/2022 | Semperlotti et al. | |
| 2002/0000343 A1 | 1/2002 | Paschereit et al. | |
| 2008/0216481 A1 | 9/2008 | Pollarolo | |
| 2008/0308061 A1 | 12/2008 | Yokota | |
| 2010/0212999 A1 | 8/2010 | Marion et al. | |
| 2011/0139541 A1 | 6/2011 | Schuermans et al. | |
| 2011/0179795 A1 * | 7/2011 | Johnson | F23R 3/28 60/725 |
| 2012/0228050 A1 | 9/2012 | Bulat | |
| 2015/0059345 A1 * | 3/2015 | Hellat | F23R 3/002 60/725 |
| 2015/0075168 A1 | 3/2015 | De Jonge et al. | |
| 2015/0096829 A1 | 4/2015 | Bothien et al. | |

(Continued)

FOREIGN PATENT DOCUMENTS

EP 2192290 B1 1/2017

*Primary Examiner* — Thomas P Burke
(74) *Attorney, Agent, or Firm* — Venable LLP; Duarte Y Ho; Michele V. Frank (57) ABSTRACT

A gas turbine engine includes a compressor section for compressing air flowing therethrough to provide a compressed air flow, a combustor including a combustion chamber, the combustion chamber configured to combust a mixture of a fuel flow and the compressed air flow to generate combustion products, and a turbine section having at least one turbine driven by the combustion products. The gas turbine engine includes a multicavity damper in fluid communication with the combustion chamber to dampen an instability generated in the combustion chamber by the combustion products. The multicavity damper has a plurality of cavity volumes and the length of each cavity volume is different.

19 Claims, 9 Drawing Sheets

(56) References Cited

U.S. PATENT DOCUMENTS

| | | |
|---|---|---|
| 2016/0003162 A1 | 1/2016 | Beck et al. |
| 2017/0176009 A1 | 6/2017 | Szwedowicz et al. |
| 2017/0321895 A1* | 11/2017 | Kim ................. F23R 3/002 |
| 2018/0174566 A1 | 6/2018 | Copley et al. |
| 2020/0202831 A1 | 6/2020 | Lee et al. |
| 2022/0282870 A1 | 9/2022 | Kim et al. |
| 2023/0175440 A1 | 6/2023 | Winkler et al. |
| 2023/0175692 A1 | 6/2023 | Kostrzewa et al. |
| 2023/0184366 A1 | 6/2023 | Hansmann et al. |

* cited by examiner

TURBINE ENGINE HAVING A MULTICAVITY DAMPER

TECHNICAL FIELD

The present disclosure relates generally to a multicavity damper, for example, in a turbine engine.

BACKGROUND

Turbine engines generally include a propulsor (e.g., a fan or a propeller) and a turbo-engine arranged in flow communication with one another. The turbo-engine includes a compressor section, a combustion section, and a turbine section. The combustion section includes a combustor for generating combustion products.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides acoustic dampers for combustion instability suppression in a combustor. When an instability is present in a combustion chamber of the combustor, the instability exhibits as a sinusoidal pressure with a large amplitude that may damage the equipment. Acoustic dampers are employed to dampen or lessen the instability. The acoustic dampers of the present disclosure have a cavity divided into a plurality of cavity volumes to augment the performance of the damper. A single cavity damper has a single volume with a single length and, thus, can target a single frequency of instability (e.g., a target frequency). The multicavity dampers of the present disclosure provide a plurality of cavity volumes, each volume having a unique length. The multicavity dampers of the present disclosure provide the ability to customize and to augment the acoustic attenuation characteristics for the specific needs of the combustion system. Multiple cavity volumes allow for the damper to capture multi-tonal behavior in the combustor and can broaden the range of frequencies damped by the acoustic damper (e.g., the attenuation curve) significantly. The multicavity dampers of the present disclosure can target and damp multiple frequencies, including targeting and damping both low and high frequency tones, in any combination, with a single damper, even if the tones are independent in frequency space. The multicavity dampers of the present disclosure assist in broadening two or more independent tones. The multicavity dampers of the present disclosure may include two or more cavities. The number of cavities may be selected on the number of target frequencies.

Figure 1:
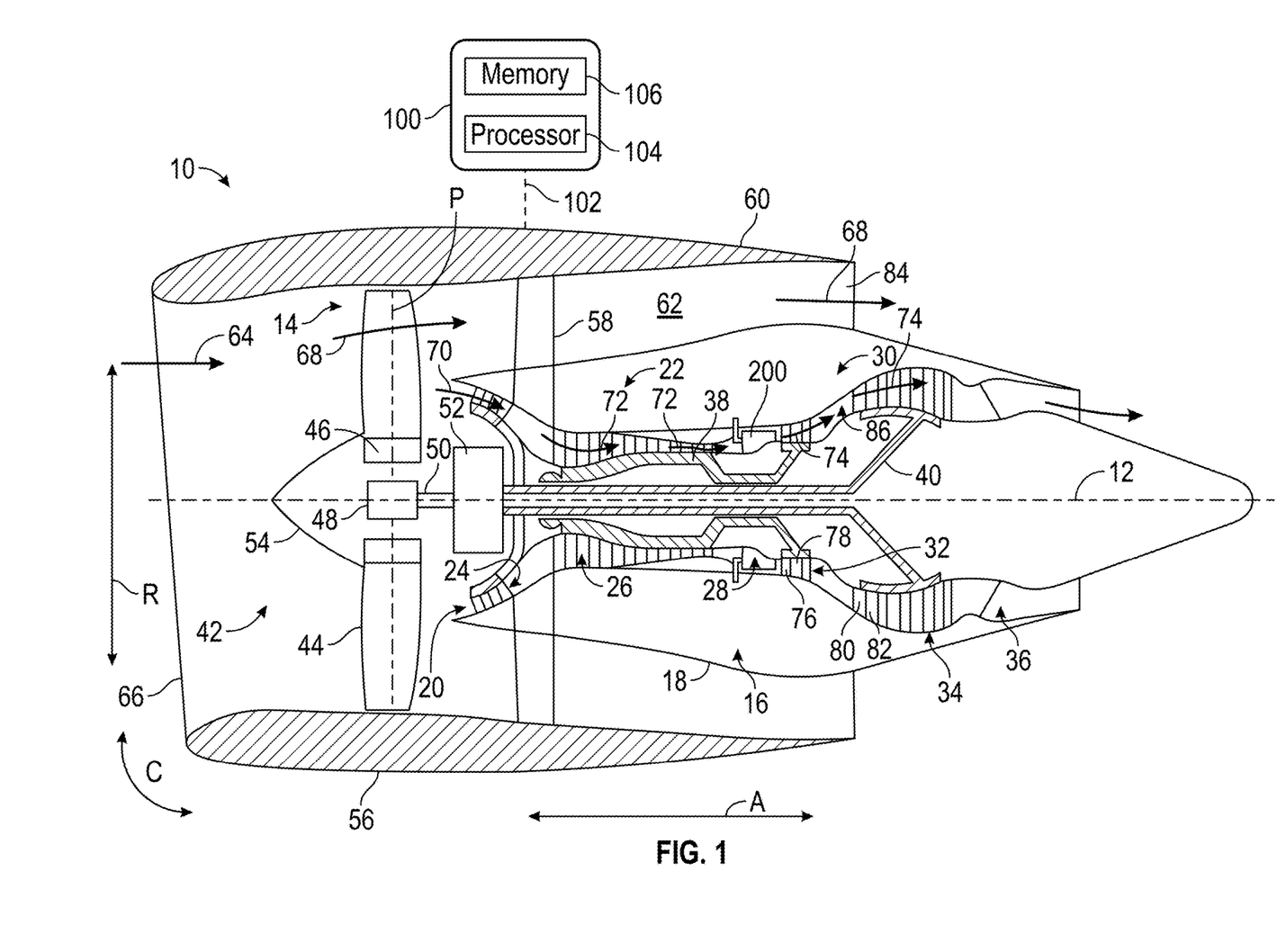
FIG. 1 illustrates a schematic cross-sectional view of a gas turbine engine, taken along a longitudinal centerline axis of the engine, according to the present disclosure.

Referring now to the drawings, FIG. 1 is a schematic cross-sectional view of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference), a radial direction R that is normal to the axial direction A, and a circumferential direction C extending about the longitudinal centerline axis 12. In general, the turbine engine 10 includes a fan section 14 and a turbo-engine 16 disposed downstream from the fan section 14.

The turbo-engine 16 includes, in serial flow relationship, a compressor section 22, a combustion section 28, and a turbine section 30. The turbo-engine 16 is substantially enclosed with an outer casing 18 that is substantially tubular and defines an annular inlet 20. As schematically shown in FIG. 1, the compressor section 22 includes a booster or a low-pressure (LP) compressor 24 followed downstream by a high-pressure (HP) compressor 26. The combustion section 28 includes a combustor 200 and is downstream of the compressor section 22. The turbine section 30 is downstream of the combustion section 28 and includes a high-pressure (HP) turbine 32 followed downstream by a low-pressure (LP) turbine 34. The turbo-engine 16 further includes a jet exhaust nozzle section 36 that is downstream of the turbine section 30, a high-pressure (HP) shaft 38 or a spool, and a low-pressure (LP) shaft 40. The HP shaft 38 drivingly connects the HP turbine 32 to the HP compressor 26. The HP turbine 32 and the HP compressor 26 rotate in unison through the HP shaft 38. The LP shaft 40 drivingly connects the LP turbine 34 to the LP compressor 24. The LP turbine 34 and the LP compressor 24 rotate in unison through the LP shaft 40. The compressor section 22, the combustion section 28, the turbine section 30, and the jet exhaust nozzle section 36 together define a core air flow path.

For the embodiment depicted in FIG. 1, the fan section 14 includes a fan 42 (e.g., a variable pitch fan) having a plurality of fan blades 44 coupled to a disk 46 in a spaced apart manner. As depicted in FIG. 1, the fan blades 44 extend outwardly from the disk 46 generally along the radial direction R. In the case of a variable pitch fan, the plurality of fan blades 44 are rotatable relative to the disk 46 about a pitch axis P by virtue of the fan blades 44 being operatively coupled to an actuation member 48 configured to collectively vary the pitch of the fan blades 44 in unison. The fan blades 44, the disk 46, and the actuation member 48 are together rotatable about the longitudinal centerline axis 12 via a fan shaft 50 that is powered by the LP shaft 40 across a power gearbox, also referred to as a gearbox assembly 52. In this way, the fan 42 is drivingly coupled to, and powered by, the turbo-engine 16 and the turbine engine 10 is an indirect drive engine. The gearbox assembly 52 is shown schematically in FIG. 1. The gearbox assembly 52 is a reduction gearbox assembly for adjusting the rotational speed of the fan shaft 50 and, thus, the fan 42 relative to the LP shaft 40 when power is transferred from the LP shaft 40 to the fan shaft 50.

Referring still to the exemplary embodiment of FIG. 1, the disk 46 is covered by a rotatable fan hub 54 aerodynamically contoured to promote an airflow through the plurality of fan blades 44. In addition, the fan section 14 includes an annular fan casing or a nacelle 56 that circumferentially surrounds the fan 42 and at least a portion of the turbo-engine 16 by a plurality of outlet guide vanes 58 that are circumferentially spaced about the nacelle 56 and the turbo-engine 16. Moreover, a downstream section 60 of the nacelle 56 extends over an outer portion of the turbo-engine 16, and, with the outer casing 18, defines a bypass airflow passage 62 therebetween.

During operation of the turbine engine 10, a volume of air 64 enters the turbine engine 10 through an inlet 66 of the nacelle 56 or the fan section 14. As the volume of air 64 passes across the fan blades 44, a first portion of air 68, also referred to as bypass air 68, is routed into the bypass airflow passage 62, and a second portion of air 70, also referred to as core air 70, is routed into the upstream section of the core air flow path through the annular inlet 20 of the LP compressor 24. The ratio between the bypass air 68 and the core air 70 is commonly known as a bypass ratio. The pressure of the core air 70 is then increased, generating compressed air 72. The compressed air 72 is routed through the HP compressor 26 and into the combustion section 28, wherein the compressed air 72 is mixed with fuel and ignited to generate combustion gases 74.

The combustion gases 74 are routed into the HP turbine 32 and expanded through the HP turbine 32 where a portion of thermal energy and kinetic energy from the combustion gases 74 is extracted via one or more stages of HP turbine stator vanes 76 and HP turbine rotor blades 78 that are coupled to the HP shaft 38. This causes the HP shaft 38 to rotate, thereby supporting operation of the HP compressor 26 (self-sustaining cycle). In this way, the combustion gases 74 do work on the HP turbine 32. The combustion gases 74 are then routed into the LP turbine 34 and expanded through the LP turbine 34. Here, a second portion of thermal energy and the kinetic energy is extracted from the combustion gases 74 via one or more stages of LP turbine stator vanes 80 and LP turbine rotor blades 82 that are coupled to the LP shaft 40. This causes the LP shaft 40 to rotate, thereby supporting operation of the LP compressor 24 (self-sustaining cycle) and rotation of the fan 42 via the gearbox assembly 52. In this way, the combustion gases 74 do work on the LP turbine 34.

The combustion gases 74 are subsequently routed through the jet exhaust nozzle section 36 of the turbo-engine 16 to provide propulsive thrust. Simultaneously, the bypass air 68 is routed through the bypass airflow passage 62 before being exhausted from a fan nozzle exhaust section 84 of the turbine engine 10, also providing propulsive thrust. The HP turbine 32, the LP turbine 34, and the jet exhaust nozzle section 36 at least partially define a hot gas path 86 for routing the combustion gases 74 through the turbo-engine 16.

The turbine engine 10 may be communicatively and operatively coupled to an engine controller 100 along a communication line 102. The engine controller 100 is configured to operate various aspects of the turbine engine 10. The engine controller 100 may be a Full Authority Digital Engine Control (FADEC). In this embodiment, the engine controller 100 is a computing device having one or more processors 104 and one or more memories 106. The processor 104 may be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 106 may include one or more computer-readable media, including, but not limited to, non-transitory computer-readable media, a computer-readable non-volatile medium (e.g., a flash memory), a RAM, a ROM, hard drives, flash drives, and/or other memory devices.

The memory 106 may store information accessible by the processor 104, including computer-readable instructions that may be executed by the processor 104. The instructions may be any set of instructions or a sequence of instructions that, when executed by the processor 104, causes the processor 104 and the engine controller 100 to perform operations. In some embodiments, the instructions may be executed by the processor 104 to cause the processor 104 to complete any of the operations and functions for which the engine controller 100 is configured, as will be described further below. The instructions may be software written in any suitable programming language, or may be implemented in hardware. Additionally, and/or alternatively, the instructions may be executed in logically and/or virtually separate threads on the processor 104. The memory 106 may further store data that may be accessed by the processor 104.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

The engine controller 100 may be communicatively coupled to one or more sensors employed in the methods of the present disclosure, such as, for example, vibration sensors (such as accelerometers), temperature sensors, speed sensors, and other sensors within the turbine engine 10. For example, the engine controller 100 may receive, and, optionally, store or record, data or information from the one or more sensors. The engine controller 100 may also control motoring of the turbine engine (e.g., rotation of the rotor described in more detail to follow).

The turbine engine 10 depicted in FIG. 1 is by way of example only. In other exemplary embodiments, the turbine engine 10 may have any other suitable configuration. For example, in other exemplary embodiments, the fan 42 may be configured in any other suitable manner (e.g., as a variable pitch fan or a fixed pitch fan) and further may be supported using any other suitable fan frame configuration. Moreover, in other exemplary embodiments, any other suitable number or configuration of compressors, turbines, shafts, or a combination thereof may be provided. In other exemplary embodiments, the engine may also be a direct drive engine, which does not have a power gearbox (e.g., no gearbox assembly 52). The fan speed is the same as the LP shaft speed for a direct drive engine. In other exemplary embodiments, aspects of the present disclosure may be incorporated into any suitable turbine engine, such as, for example, turbofan engines, propfan engines, turboprop engines, unducted engines, or turboshaft engines.

Figure 2:
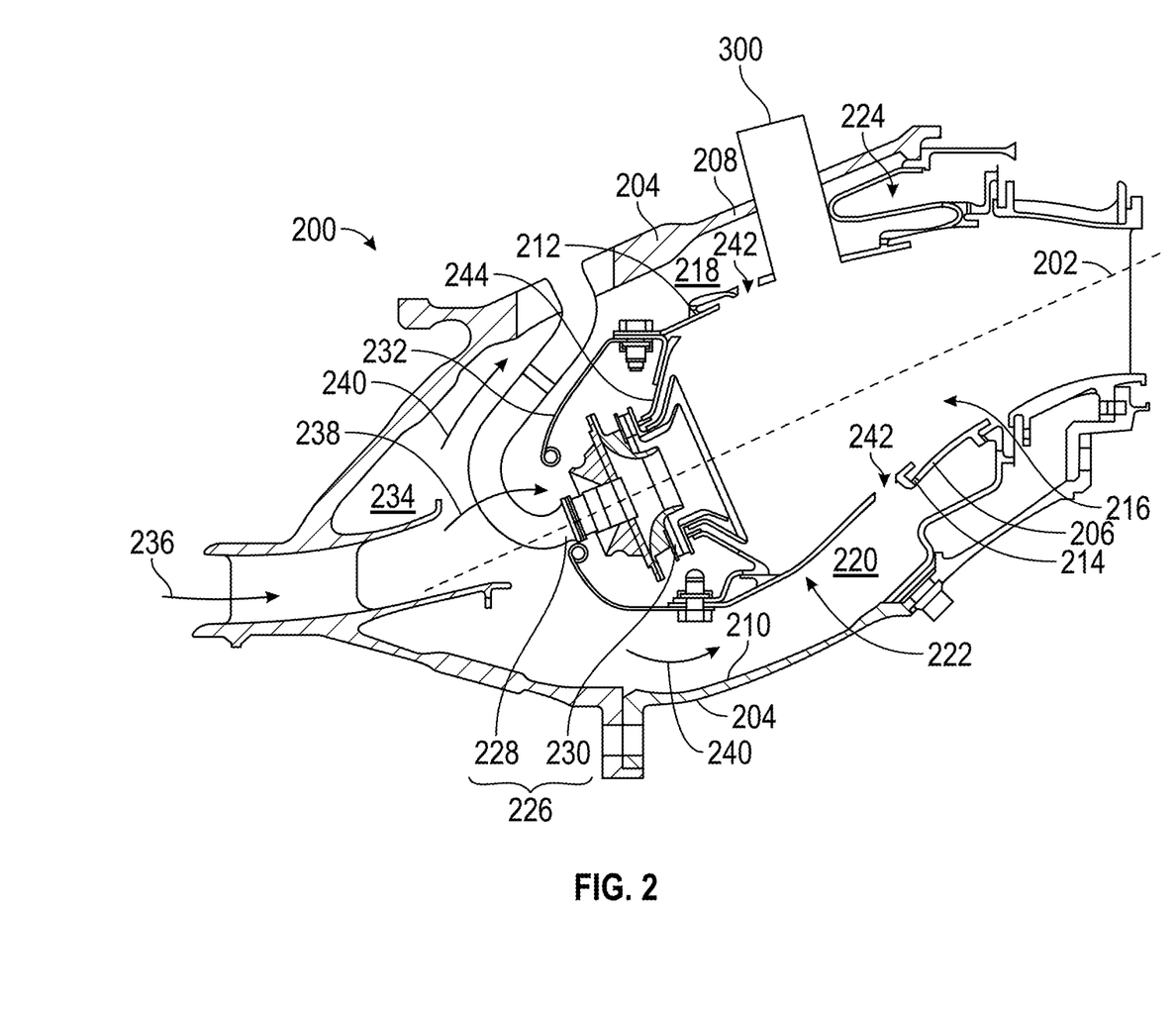
FIG. 2 illustrates a schematic cross-sectional view of a combustor for the turbine engine of FIG. 1, taken along a longitudinal centerline axis of the engine, according to the present disclosure.

FIG. 2 illustrates a cross-sectional view of the combustor 200 taken along the longitudinal centerline axis 12 (FIG. 1). The combustor 200 has a longitudinal centerline axis 202. The combustor 200 includes a combustor casing 204 and a combustor liner 206. The combustor casing 204 has an outer casing 208 and an inner casing 210, and the combustor liner 206 has an outer liner 212 and an inner liner 214. A combustion chamber 216 is formed within the combustor liner 206. More specifically, the outer liner 212 and the inner liner 214 are disposed between the outer casing 208 and the inner casing 210. The outer liner 212 and the inner liner 214 are spaced radially from each other such that the combustion chamber 216 is defined therebetween. The outer casing 208 and the outer liner 212 form an outer passage 218 therebetween, and the inner casing 210 and the inner liner 214 form an inner passage 220 therebetween. As illustrated, the combustor 200 is a single annular combustor, but, in other embodiments, the combustor 200 may be any other combustor, such as a can or a can-annular arrangement depending on the type of engine in which the combustor 200 is located.

The combustion chamber 216 has a forward end 222 (downstream end) and an aft end 224 (upstream end). A swirler/fuel nozzle assembly 226 is positioned at the forward end 222 of the combustion chamber 216. The swirler/fuel nozzle assembly 226 includes a fuel nozzle 228 and a swirler 230. In the example of an annular combustor, such as combustor 200, the swirler/fuel nozzle assembly 226 may be one of a plurality of swirler/fuel nozzle assemblies 226 arranged in an annular configuration in the circumferential direction around the longitudinal centerline axis 12 (FIG. 1).

As discussed above, and with reference to FIGS. 1 and 2, the compressor section 22, the combustion section 28 (including the combustor 200), and the turbine section 30 form, at least in part, a flow path for the core air 70. Core air 70 entering the annular inlet 20 is compressed by the LP compressor 24 and the HP compressor 26 and flows to the combustor 200 as a compressed air flow 236. A cowl assembly 232 is coupled to upstream ends of the outer liner 212 and the inner liner 214, respectively. An annular opening 234 formed in the cowl assembly 232 enables a first portion 238 of the compressed air flow 236 to enter the combustor 200. The first portion 238 flows through the annular opening 234 to support combustion within the combustion chamber 216. A second portion 240 of the compressed air flow 236 flows around the outside of the combustor liner 206 through the outer passage 218 and the inner passage 220. The second portion 240 may be introduced into the combustion chamber 216 through a plurality of circumferentially spaced dilution holes 242 formed in the combustor liner 206 at one or more positions downstream of the swirler/fuel nozzle assembly 226. Although a single dilution hole 242 is shown in each of the outer liner 212 and the inner liner 214, a plurality of dilution holes 242 may be provided in a circumferential direction about the longitudinal centerline axis 202. Furthermore, the dilution holes 242 may be provided in the outer liner 212 or the inner liner 214, or both the outer liner 212 and the inner liner 214.

Each swirler/fuel nozzle assembly 226 of the plurality of swirler/fuel nozzle assemblies 226 is coupled to a dome plate 244. Each swirler/fuel nozzle assembly 226 receives the first portion 238 of the compressed air flow 236 from the annular opening 234. The swirler 230 of the swirler/fuel nozzle assembly 226 generates turbulence in the first portion 238. The fuel nozzle 228 injects fuel into the turbulent air flow and the turbulence promotes rapid mixing of the fuel with the air. The resulting mixture of the fuel and the compressed air is discharged into the combustion chamber 216 and is combusted in the combustion chamber 216, generating combustion gases (combustion products), which accelerate as the combustion gases leave the combustion chamber 216.

Figure 3:
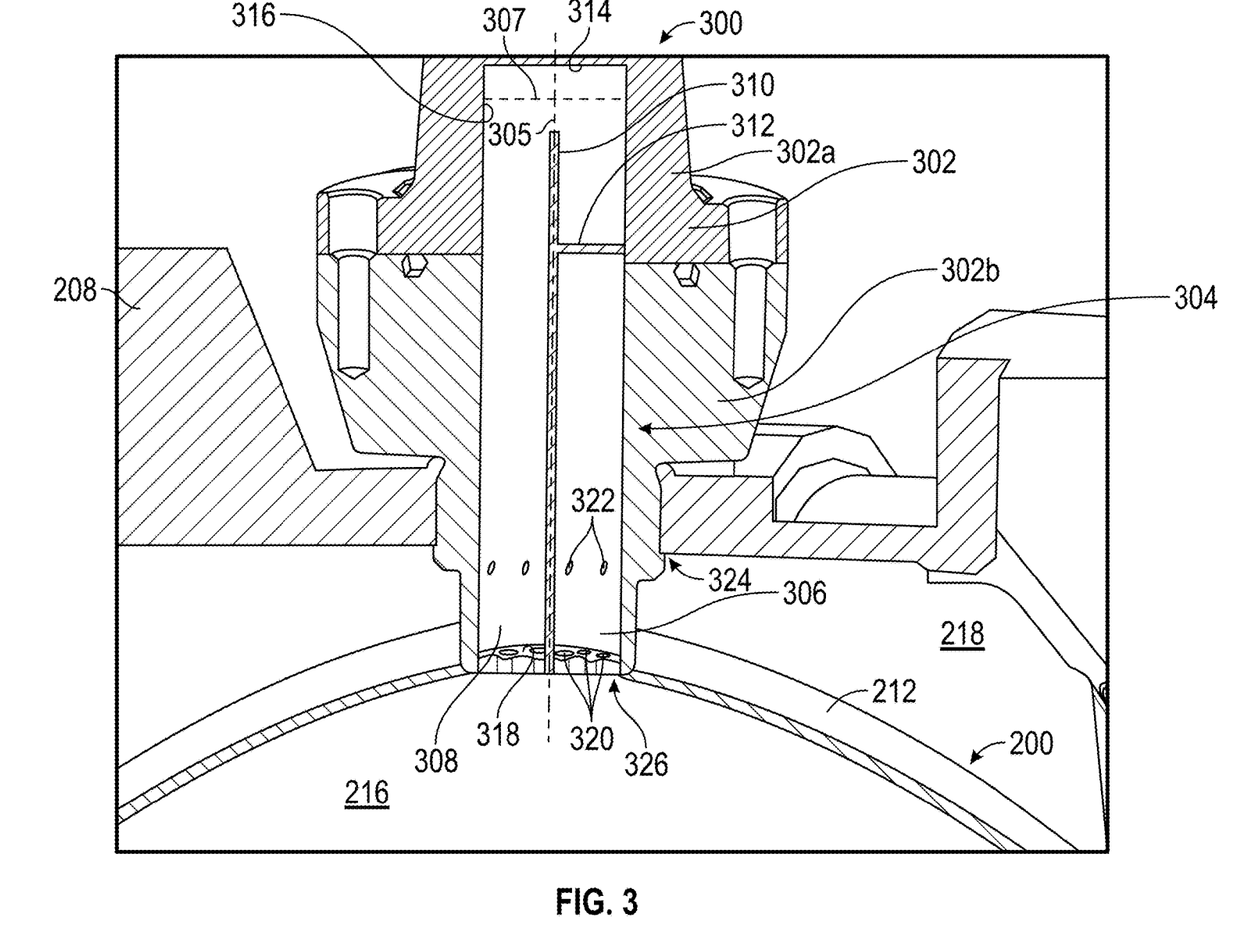
FIG. 3 illustrates a schematic partial cross-sectional view of a damper for the combustor of FIG. 2, according to the present disclosure.

As shown in FIGS. 2 and 3, the combustor 200 includes a multicavity damper 300 extending through an opening 324 in the outer casing 208 and an opening 326 in the outer liner 212 of the combustor 200. Although illustrated extending through the opening 324 of the outer casing 208, in some examples, the multicavity damper 300 may be fully within the outer casing 208, such that multicavity damper 300 extends only through the opening 326 through the outer liner 212, but not through the outer casing 208. The multicavity damper 300 is an acoustic damper. A single multicavity damper 300 is illustrated in FIG. 2. The multicavity damper 300 may, however, include a plurality distributed circumferentially around the combustor 200. Each multicavity damper 300 provided extends through a single opening (e.g., the opening 324) in the outer liner 212 such that the multiple cavities of the multicavity damper 300 communicate with the combustion chamber 216 through the single opening 324. As described in more detail to follow, this allows for the multi-tonal and broad frequency damping with a single damper and single opening in the outer liner 212.

FIG. 3 illustrates the multicavity damper 300 in more detail. The multicavity damper 300 includes a damper body 302 having a first damper body portion 302a and a second damper body portion 302b fastened or coupled together. In other examples, the damper body 302 is a unitary, single piece body.

The multicavity damper 300 includes a main damper cavity 304 within the damper body 302. The main damper cavity 304 is a multicavity volume including a first cavity volume 306 and a second cavity volume 308. As discussed in more detail to follow, the number of cavities is not limited to two, and more may be provided. The damper body 302 includes an inner cylindrical surface 316 having a top surface 314 and a bottom surface 318 that together define the main damper cavity 304. The top surface 314 and the bottom surface 318 may be planar. The main damper cavity 304 defines a longitudinal axis 305, and a radial axis 307 that is perpendicular to the longitudinal axis 305. The radial axis 307 may define a diameter of the main damper cavity 304. A first inner wall 310 extends parallel to the longitudinal axis 305. In the example of FIG. 3, the first inner wall 310 extends from the bottom surface 318. The first inner wall 310 may extend in the direction of the radial axis 307 across the entire diameter of the main damper cavity 304 such that the first inner wall 310 bisects the main damper cavity 304. A second inner wall 312 extends parallel to the radial axis 307 between the first inner wall 310 and the inner cylindrical surface 316. In some examples, the second inner wall 312 extends fully between the first inner wall 310 and the inner cylindrical surface 316 such that the second inner wall 312 is semi-circular.

The first inner wall 310 and the second inner wall 312 divide the main damper cavity 304 into multiple cavities, such as, the first cavity volume 306 and the second cavity volume 308. That is, the first cavity volume 306 is defined between the inner cylindrical surface 316, the bottom surface 318, the first inner wall 310, and the second inner wall 312. The first cavity volume 306 is semi-circular in shape. The second cavity volume 308 is defined between the inner cylindrical surface 316, the bottom surface 318, the top surface 314, the first inner wall 310, and the second inner wall 312.

Each of the first cavity volume 306 and the second cavity volume 308 is in fluid communication with the combustion chamber 216 through one or more openings 320. Each of the first cavity volume 306 and the second cavity volume 308 is in fluid communication with the outer passage 218 through one or more openings 322. Within the multicavity damper 300, the first cavity volume 306 and the second cavity volume 308 are isolated and are not in fluid communication with each other.

The one or more openings 320 function as a neck such that the multicavity damper 300 is a Helmholtz resonator or a quarter wave tube. When an instability is present in the combustion chamber 216, the instability exhibits as a sinusoidal pressure with a large amplitude that may damage the equipment. The multicavity damper 300 dampens or lessens the instability. The multicavity damper 300 provides the ability to customize and to augment the acoustic attenuation characteristics within the combustion chamber 216. The multiple cavity volumes of the multicavity damper 300 allows for the damper to capture multi-tonal behavior in the combustion chamber 216 and broaden the attenuation curve.

Figure 4:
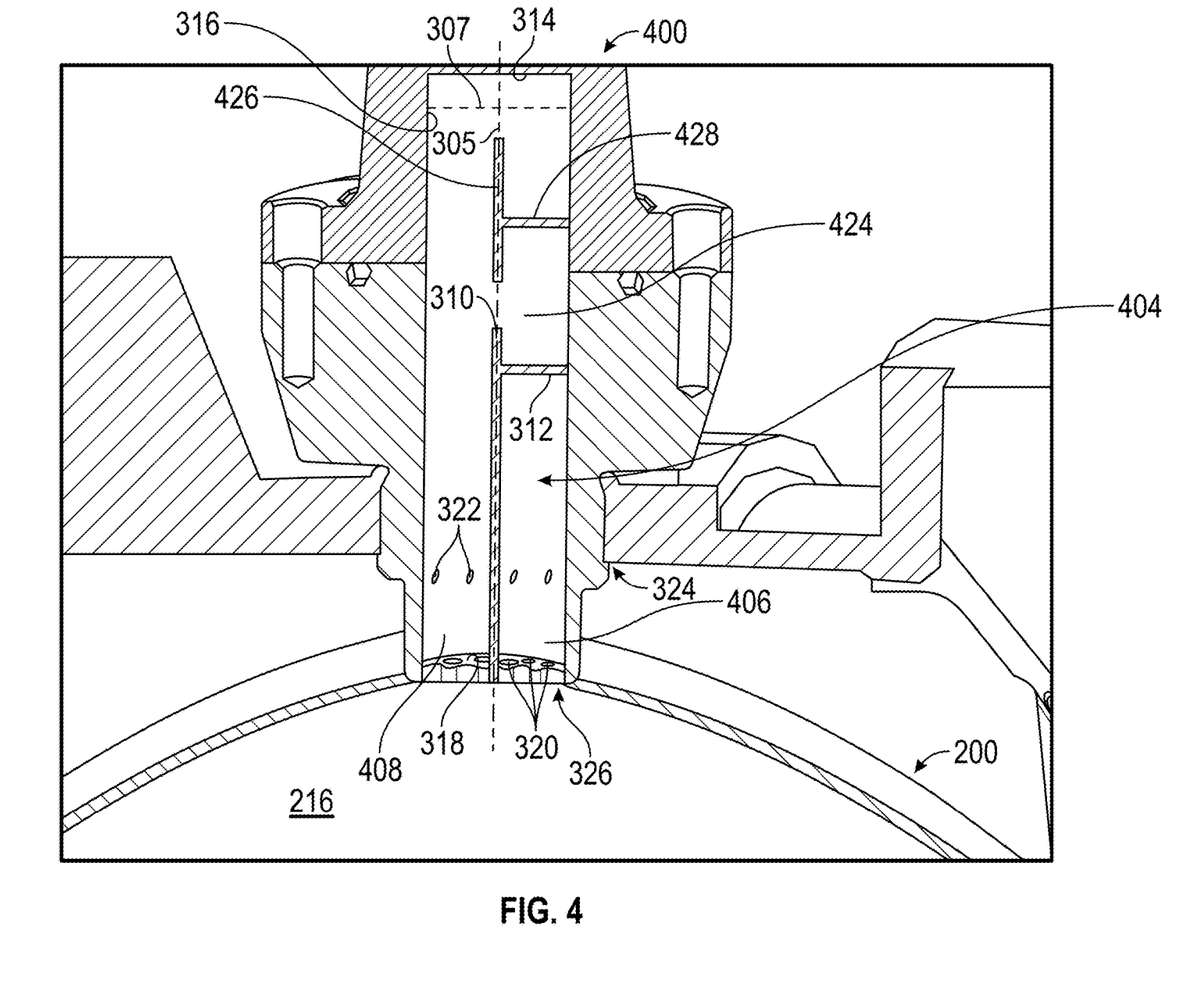
FIG. 4 illustrates a schematic partial cross-sectional view of a damper for the combustor of FIG. 2, according to the present disclosure.

FIG. 4 illustrates an exemplary multicavity damper 400. The multicavity damper 400 is similar to the multicavity damper 300 of FIG. 3 except as noted below. Accordingly, the same reference numerals will be used for components of the multicavity damper 400 that are the same as or similar to the components of the multicavity damper 300 discussed above. In some cases, references numerals are omitted for clarity from FIG. 4. Like illustrated components, however, should be understood to be the same as described with respect to FIG. 3. The description of these components above applies to this embodiment, and a detailed description of those components is omitted herein.

The multicavity damper 300 of FIG. 3 includes two damper cavities within the main damper cavity 304, the first cavity volume 306, and the second cavity volume 308. The multicavity damper 400 includes a main damper cavity 404 having three damper cavities, a first cavity volume 406, a second cavity volume 408, and a third cavity volume 424. As with the multicavity damper 300, the first cavity volume 406 is defined by the inner cylindrical surface 316, the bottom surface 318, the first inner wall 310, and the second inner wall 312.

Again, as with the multicavity damper 300, the second cavity volume 408 is defined between the inner cylindrical surface 316, the bottom surface 318, the top surface 314, and the first inner wall 310. In the multicavity damper 400, however, the second cavity volume 408 is not defined by the second inner wall 312, but is instead, further defined by a third inner wall 426 and a fourth inner wall 428. The third inner wall 426 extends parallel to the longitudinal axis 305 and is coplanar with the first inner wall 310. The fourth inner wall 428 extends parallel to the radial axis 307 and may extend across the entire diameter of the main damper cavity 404. The fourth inner wall 428 is parallel to and offset from the second inner wall 312.

The third cavity volume 424 is defined by the radially inner cylindrical surface 316, the first inner wall 310, the second inner wall 312, the third inner wall 426, and the fourth inner wall 428. The first inner wall 310 and the third inner wall 426 are offset such that the third cavity volume 424 is in fluid communication with the second cavity volume 408. The first cavity volume 406 is isolated and is not in fluid communication with either of the second cavity volume 408 or the third cavity volume 424. Each of the first cavity volume 406, the second cavity volume 408, and the third cavity volume 424 (by way of the second cavity volume 408) is in fluid communication with the combustion chamber 216 via the one or more openings 320.

Figure 5A:
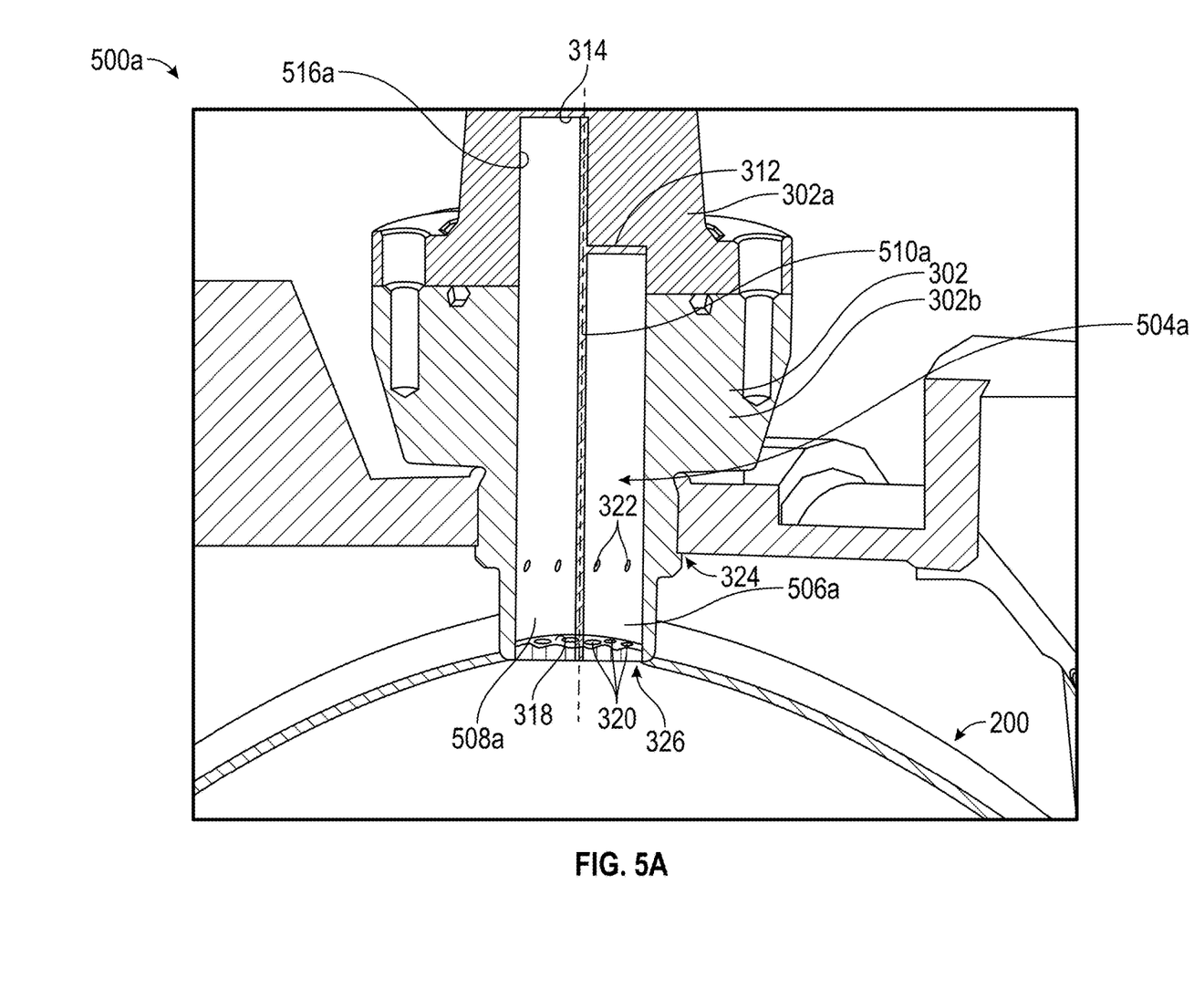
FIG. 5A illustrates a schematic partial cross-sectional view of a damper for the combustor of FIG. 2, according to the present disclosure.

FIG. 5A illustrates an exemplary multicavity damper 500a. The multicavity damper 500a is similar to the multicavity damper 300 of FIG. 3 except as noted below. Accordingly, the same reference numerals will be used for components of the multicavity damper 500a that are the same as or similar to the components of the multicavity damper 300 discussed above. In some cases, references numerals are omitted for clarity from FIG. 5A. Like illustrated components, however, should be understood to be the same as described with respect to FIG. 3. The description of these components above applies to this embodiment, and a detailed description of those components is omitted herein.

The multicavity damper 500a includes two damper cavities within a main damper cavity 504a, a first cavity volume 506a, and a second cavity volume 508a. The first cavity volume 506a is defined by an inner cylindrical surface 516a, the bottom surface 318, a first inner wall 510a, and the second inner wall 312. The second cavity volume 508a is defined by the inner cylindrical surface 516a, the bottom surface 318, the first inner wall 510a, and the top surface 314. The difference between the multicavity damper 300 of FIG. 3 and the multicavity damper 500a of FIG. 5A is that there is no cavity volume above the second inner wall 312. Instead, the damper body 302, and, more particularly, the first damper body portion 302a is solid in this portion. In the example of FIG. 5A, the first cavity volume 506a and the second cavity volume 508a are not in fluid communication with each other within the multicavity damper 500a due to the solid first inner wall 510a separating the two volumes.

Figure 5B:
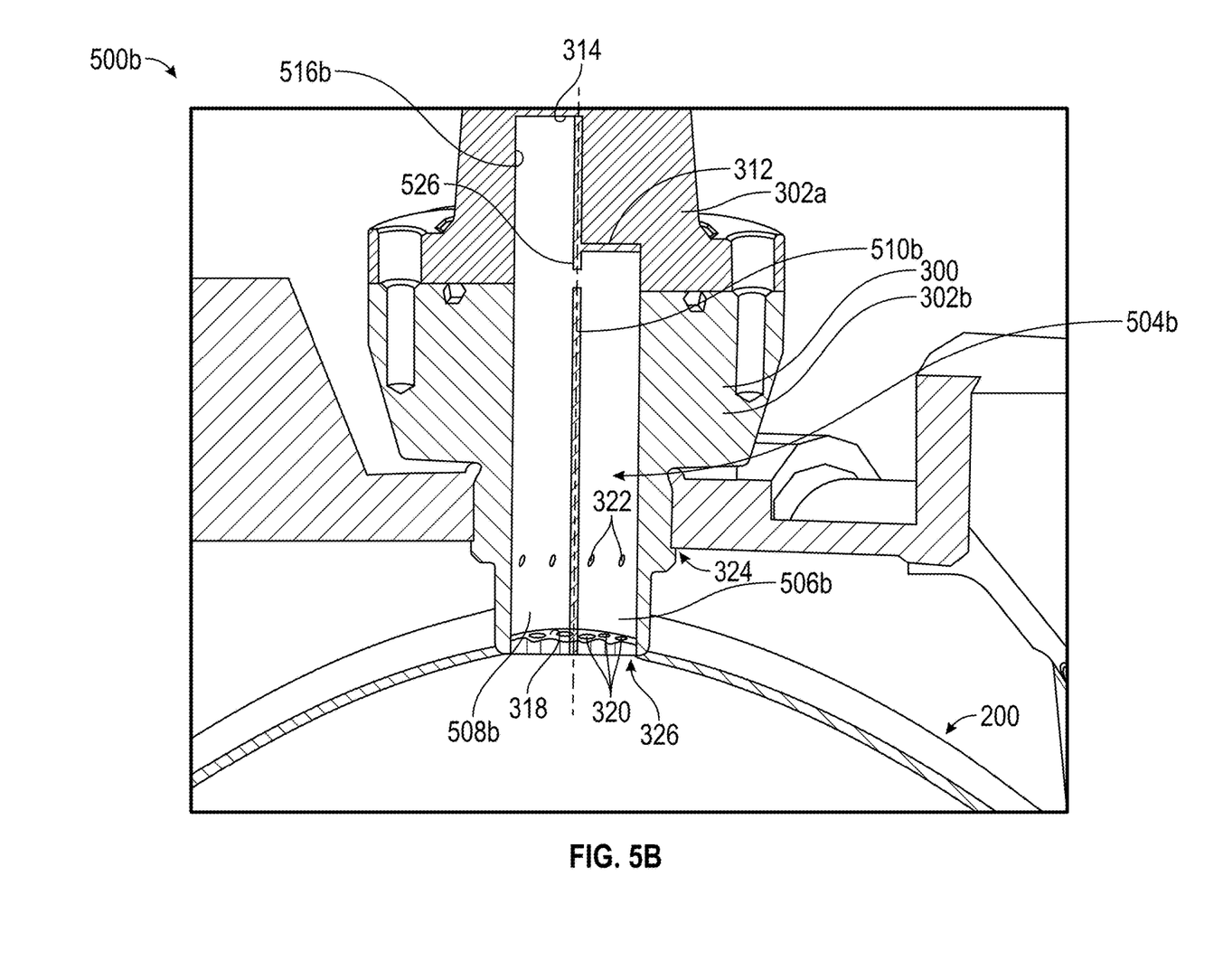
FIG. 5B illustrates a schematic partial cross-sectional view of a damper for the combustor of FIG. 2, according to the present disclosure.

FIG. 5B illustrates an exemplary multicavity damper 500b. The multicavity damper 500b is similar to the multicavity damper 500a except as noted below. Accordingly, the same reference numerals will be used for components of the multicavity damper 500b that are the same as or similar to the components of the multicavity damper 500a discussed above. In some cases, references numerals are omitted for clarity from FIG. 5B. Like illustrated components, however, should be understood to be the same as described with respect to FIG. 5A (and FIG. 3). The description of these components above applies to this embodiment, and a detailed description of those components is omitted herein.

The multicavity damper 500b includes two damper cavities within a main damper cavity 504b, a first cavity volume 506b, and a second cavity volume 508b. The first cavity volume 506b is defined by an inner cylindrical surface 516b, the bottom surface 318, a first inner wall 510b, the second inner wall 312, and a third inner wall 526. The second cavity volume 508b is defined by the inner cylindrical surface 516b, the bottom surface 318, the first inner wall 510b, the third inner wall 526, and the top surface 314. The difference between the multicavity damper 500a of FIG. 5A and the multicavity damper 500b of FIG. 5B is that the first cavity volume 506b and the second cavity volume 508b fluidly communicate within the multicavity damper 500b through a space or gap between the first inner wall 510b and the third inner wall 526.

Each of FIGS. 3 to 5B illustrates a damper having a variety of cavity volumes with respective cavity volumes. Although a plurality of inner walls are described for defining the multiple cavities, only a single inner wall is required. That is, multiple cavities may be defined between the inner cylindrical surface and a single inner wall. Likewise, more inner walls than described in the figures (e.g., FIG. 4) are also contemplated to define the multiple cavities.

When comparing FIG. 3 to FIG. 5A, for example, the first cavity volume 306 and the first cavity volume 506a have the same volume. However, the second cavity volume 308 has a greater volume than the second cavity volume 508a. This is due to the additional cavity volume extending between the second inner wall 312 and the top surface 314 in FIG. 3.

Comparing the aspect of FIG. 3 to the aspect of FIG. 4, the second cavity volume 308 and the second cavity volume 408 have the same volume. The first cavity volume 306 has a greater volume than the first cavity volume 406 due to the inclusion of the third cavity volume 424 between the second inner wall 312 and the fourth inner wall 428.

Comparing the aspect of FIG. 4 to the aspect of FIGS. 5A and 5B, none of the cavities have the same volume. The first cavity volume 406 has a smaller volume than the first cavity volume 506a (again, due to the inclusion of the third cavity volume 424). The second cavity volume 408 has a greater volume than the second cavity volume 508a (due to the additional cavity volume extending between the second inner wall 312 and the top surface 314).

The examples shown in FIGS. 3 to 5B are a few examples of damper cavities. Other exemplary cavities are contemplated having any number of cavity volumes, as long as each cavity volume is in fluid communication with the combustion chamber 216. In this manner, the number of cavity volumes and the volume of each of the cavity volumes may be selected to achieve a desired damping within the combustion chamber 216 (FIG. 2), as is described in more detail below. In each of the dampers described herein, each of the cavities within the same damper has a unique length (e.g., the dimension extending parallel to the longitudinal axis 305). That is, for example, in the multicavity damper 300, the length of the first cavity volume 306 is different than the length of the second cavity volume 308. In the multicavity damper 400, each of the first cavity volume 406, the second cavity volume 408, and the third cavity volume 424 has different lengths from each other. In the multicavity damper 500a and 500b, the length of the first cavity volume 506a, 506b, is different than the length of the second cavity volume 508a, 508b. As noted above, additional multicavity dampers are contemplated (e.g., with four, five, six, etc., volumes). For each volume of the multicavity damper, the length is unique with respect to the other volumes within the multicavity damper.

Figure 6A:
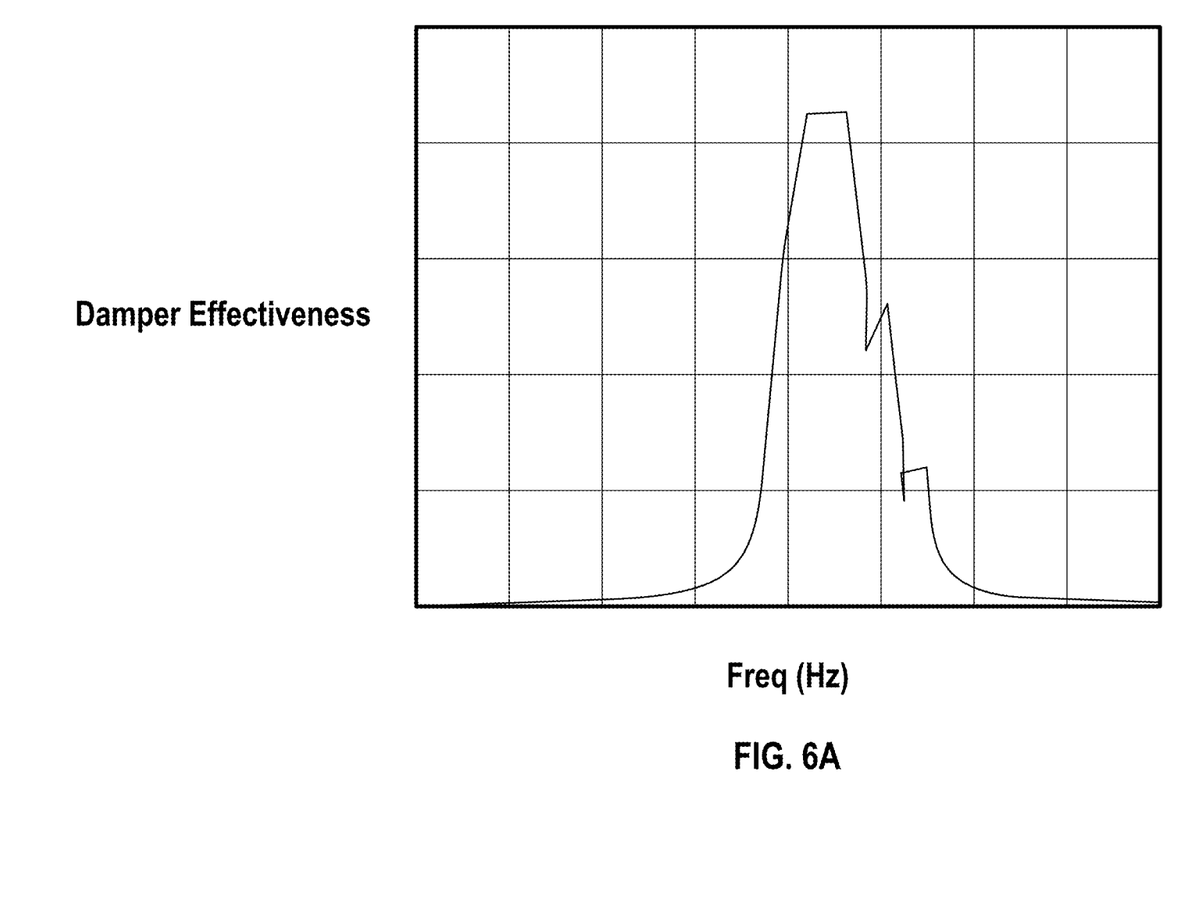
FIG. 6A illustrates a graph of damper effectiveness versus frequency for a damper, according to the present disclosure.
Figure 6B:
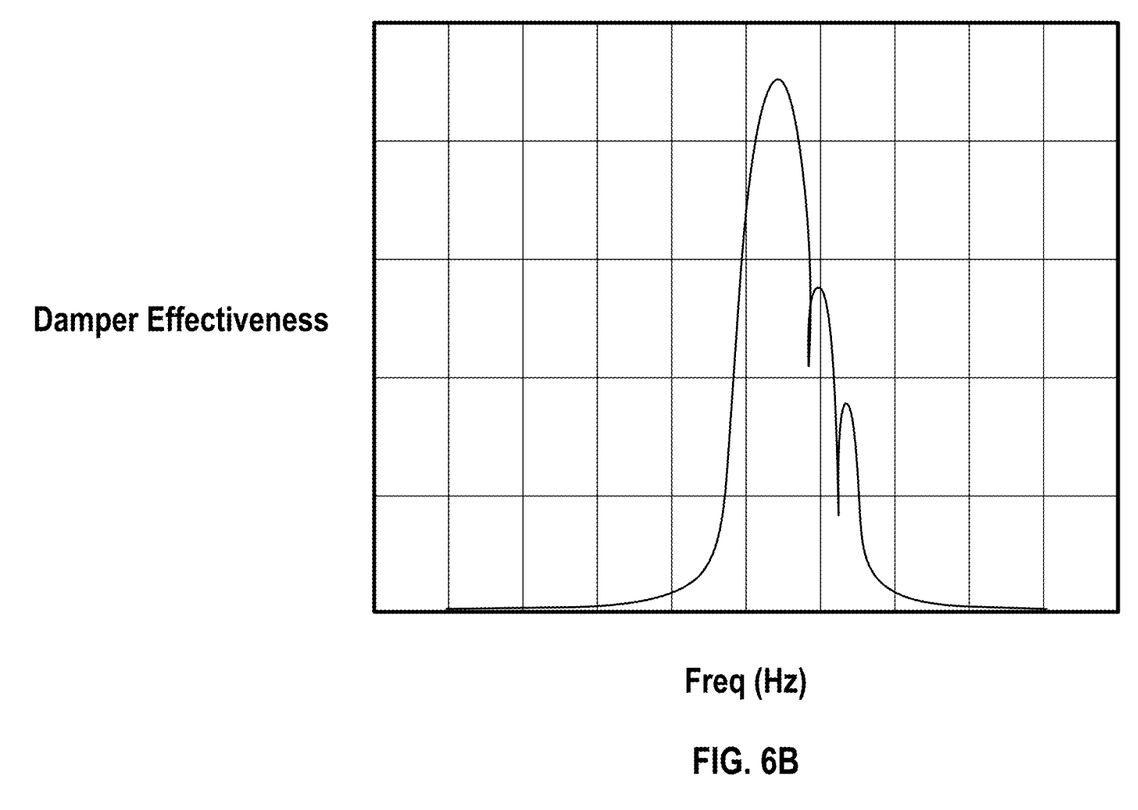
FIG. 6B illustrates a graph of damper effectiveness versus frequency for a damper, according to the present disclosure.
Figure 6C:
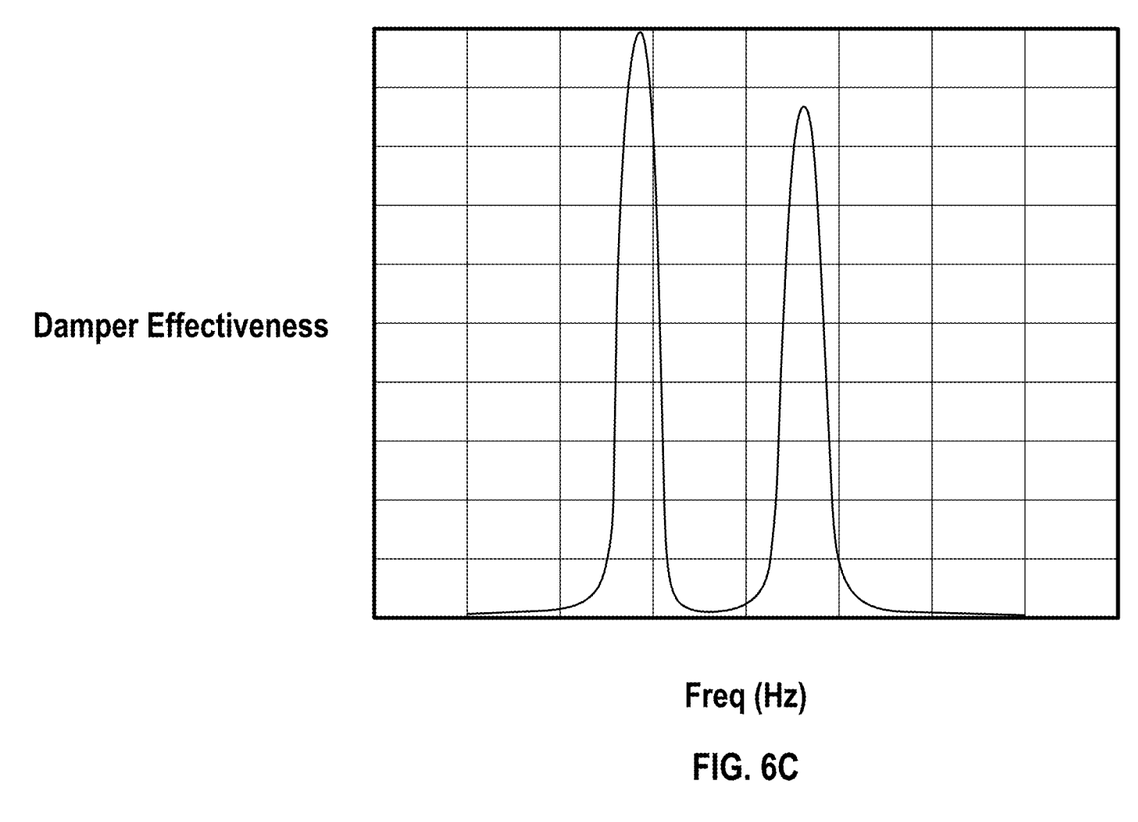
FIG. 6C illustrates a graph of damper effectiveness versus frequency for a damper, according to the present disclosure.

FIGS. 6A to 6C show exemplary graphs illustrating the effect of multicavity dampers. FIG. 6A illustrates the effect of a multicavity damper having four volumes, FIG. 6B illustrates the effect of a multicavity damper having three volumes, and FIG. 6C illustrates the effect of a multicavity damper having two volumes.

As illustrated in FIGS. 6A to 6C, there is a direct proportional relationship between the number of independent cavity volumes within a multicavity damper and the number of discrete frequencies (also referred to as tones) that are attenuated or damped. This can be effectively written as:

$$n_{ds} \propto n_{fp}$$

where $n_{ds}$ is the number of independent damper volumes and $n_{fp}$ is the number of discrete frequencies (tones) that are attenuated or damped. The damper volumes $n_{ds}$ can be from one volume to ten volumes and, thus, the target frequencies $n_{fp}$ can also be from one frequency to ten frequencies. In one example, the damper volumes $n_{ds}$ can be from one volume to four volumes and, thus, the target frequencies $n_{fp}$ can also be from one frequency to four frequencies.

As the multiple cavity volumes get closer in size to each other, the target frequencies begin to move closer to each other and farther away from being discrete target frequencies. In such cases, the attenuation curve begins to blend. Accordingly, to maintain discrete target frequencies, the volumes must be at least twenty percent different from the other volumes within the multicavity damper.

Referring back to FIG. 6B, the multicavity damper referenced in FIG. 6B includes three cavity volumes. Table 1 illustrates relationships for the unique length of each cavity volume and the target frequency (also referred to as peak frequency).

TABLE 1

| Cavity Volume Length L | Target (Peak) Frequency F |
|---|---|
| 1.032 * L | 0.966 * F |
| 1.095 * L | 0.901 * F |

In this example, the lengths of each volume are less than twenty percent different, and, therefore, the peaks of the frequencies begin to merge with the adjacent frequency. Such merging provides targeting of discrete frequencies, as noted above, but also allows for broadening the damping performance across a frequency band. A frequency band is the range of frequencies over which the multicavity damper is effective. Broadening the dampening frequency band refers to broadening the range of frequencies over which the multicavity damper is effective. That is, as compared to FIG. 6C, for example, more frequencies (between the target frequency, also referred to as peak frequency) are damped due to the blending or merging of the attenuation curve.

In FIG. 6C, the multicavity damper referenced includes two cavity volumes. Table 2 illustrates the relationships for the unique length of each cavity volume and the target frequency.

TABLE 2

| Cavity Volume Length L | Target (Peak) Frequency F |
|---|---|
| 2 * L | 0.685 * F |

In this example, the lengths are greater than twenty percent different, and, therefore, the peaks are distinct and separated, with no blending. This allows for targeting of two distinct tones.

Accordingly, the multicavity dampers of the present disclosure allow for (1) targeting of discrete frequencies and (2) broadening of the frequency band targeted.

The dampers of the present disclosure, therefore, provide the ability to customize and to augment the damper acoustic performance based on the tones that require suppression. This allows for broader attenuation with a single damper and multi-tonal attenuation with a single damper. Stated another way, the multicavity dampers of the present disclosure provide the ability to damp broad frequency ranges or multiple discrete tones with a single damper. That is, the single damper (e.g., multicavity damper 300, multicavity damper 400, multicavity damper 500a, or multicavity damper 500b) provides a single entrance into the combustion liner with the ability to dampen multi-tonal attenuation and broader attenuation within the single damper. This is advantageous since each additional entrance into the combustion liner negatively impacts performance. The dampers of the present disclosure, therefore, allow for damping acoustic behavior with a single entrance to the combustion liner.

Further aspects are provided by the subject matter of the following clauses.

A gas turbine engine comprising a compressor section for compressing air flowing therethrough to provide a compressed air flow, a combustor including a combustion chamber, the combustion chamber configured to combust a mixture of a fuel flow and the compressed air flow to generate combustion products, a turbine section having at least one turbine driven by the combustion products, and a multicavity damper in fluid communication with the combustion chamber to dampen an instability generated in the combustion chamber by the combustion products, the multicavity damper having a plurality of cavity volumes and a length of each cavity volume being different, wherein a number of cavity volumes of the multicavity damper is directly proportional to a number of target frequencies.

A gas turbine engine comprising a compressor section for compressing air flowing therethrough to provide a compressed air flow, a combustor including a combustion chamber, the combustion chamber configured to combust a mixture of a fuel flow and the compressed air flow to generate combustion products, a turbine section having at least one turbine driven by the combustion products, and a multicavity damper in fluid communication with the combustion chamber to dampen an instability generated in the combustion chamber by the combustion products, the multicavity damper having a plurality of cavity volumes, wherein a number of cavity volumes of the multicavity damper is directly proportional to a number of target frequencies.

A gas turbine engine comprising a compressor section for compressing air flowing therethrough to provide a compressed air flow, a combustor including a combustion chamber, the combustion chamber configured to combust a mixture of a fuel flow and the compressed air flow to generate combustion products, a turbine section having at least one turbine driven by the combustion products, and a multicavity damper in fluid communication with the combustion chamber to dampen an instability generated in the combustion chamber by the combustion products, the multicavity damper having a plurality of cavity volumes and a length of each cavity volume being different.

A gas turbine engine comprising a compressor section for compressing air flowing therethrough to provide a compressed air flow, a combustor including a combustion chamber, the combustion chamber configured to combust a mixture of a fuel flow and the compressed air flow to generate combustion products, a turbine section having at least one turbine driven by the combustion products, and a plurality of multicavity dampers in fluid communication with the combustion chamber, each multicavity damper in fluid communication with the combustion chamber through a respective single opening in a combustion liner of the combustion chamber.

The gas turbine engine of the preceding clause, wherein each of the plurality of cavity volumes is fluidly isolated from each other within the multicavity damper.

The gas turbine engine of any preceding clause, wherein the length of each cavity volume is less than twenty percent different from one another.

The gas turbine engine of any preceding clause, wherein the length of each cavity volume is greater than twenty percent different from one another.

The gas turbine engine of any preceding clause, wherein the length of a first cavity volume is less than twenty percent different from a length of a second cavity volume, and the length of the first cavity volume is greater than twenty percent different from a length of a third cavity volume.

The gas turbine engine of any preceding clause, wherein the length of a first cavity volume is less than twenty percent different from a length of a second cavity volume, and the length of the second cavity volume is greater than twenty percent different from a length of a third cavity volume.

The gas turbine engine of any preceding clause, wherein the plurality of cavity volumes comprise a first cavity volume having a first cavity volume length and a second cavity volume having a second cavity volume length.

The gas turbine engine of any preceding clause, wherein the first cavity volume dampens a first target frequency and the second cavity volume dampens a second target frequency, wherein the first target frequency is different than the second target frequency.

The gas turbine engine of any preceding clause, wherein the first cavity volume length is less than twenty percent different than the second cavity volume length such that an attenuation curve of the multicavity damper comprises two frequency curves with distinct frequency peaks, the two frequency curves merging to provide a broadened dampening frequency band.

The gas turbine engine of any preceding clause, wherein the first cavity volume length is greater than twenty percent different than the second cavity volume length such that an attenuation curve of the multicavity damper comprises two frequency curves with distinct frequency peaks, the two frequency curves being distinct and separate with no blending of the frequency curves.

The gas turbine engine of any preceding clause, further comprising a third cavity volume having a third cavity volume length, wherein the third cavity volume dampens a third target frequency that is different from the first target frequency and the second target frequency.

The gas turbine engine of any preceding clause, wherein the multicavity damper has a body and a main damper cavity defined by an inner cylindrical surface of the body, and the main damper cavity is divided by inner walls into the plurality of damper cavity volumes.

The gas turbine engine of any preceding clause, wherein the main damper cavity has a longitudinal axis and a radial axis, and the inner walls include a first inner wall extending parallel to the longitudinal axis to separate a first cavity volume of the plurality of cavity volumes from a second cavity volume of the plurality of cavity volumes.

The gas turbine engine of any preceding clause, further comprising a second inner wall extending parallel to the radial axis to separate the first cavity volume from the second cavity volume.

The gas turbine engine of any preceding clause, wherein the first cavity volume has a length that is less than a length of the main damper cavity and the second cavity volume has a length that is greater than a length of the main damper cavity.

The gas turbine engine of any preceding clause, further comprising a third inner wall extending parallel to the longitudinal axis and a fourth inner wall extending parallel to the radial axis, wherein the main damper cavity comprises a third cavity volume defined between each of the first inner wall, the second inner wall, the third inner wall, and the fourth inner wall.

The gas turbine engine of any preceding clause, wherein the first cavity volume has a length that is less than a length of the main damper cavity and the second cavity volume has a length that is equal to a length of the main damper cavity.

The gas turbine engine of any preceding clause, wherein the multicavity damper is coupled to an outer liner of the combustor through a single opening in the outer liner.

The gas turbine engine of any preceding clause, wherein the multicavity damper is one of a plurality of multicavity dampers disposed circumferentially about the combustor.

The gas turbine engine of any preceding clause, wherein each of the plurality of multicavity dampers is the same.

The gas turbine engine of any preceding clause, wherein the multicavity damper is defined by $n_{ds} \propto n_{fp}$, where $n_{ds}$ is the number of independent damper volumes and $n_{fp}$ is the number of discrete frequencies (tones) that are attenuated or damped.

The gas turbine engine of any preceding clause, wherein the number of independent damper volumes is from one volume to ten volumes and the number of discrete frequencies is from one frequency to ten frequencies.

The gas turbine engine of any preceding clause, wherein the number of independent damper volumes is from one volume to four volumes and the number of discrete frequencies is from one frequency to four frequencies.

The gas turbine engine of any preceding clause, wherein the number of independent damper volumes is equal to the number of discrete frequencies.

The gas turbine engine of any preceding clause, wherein a length of each cavity volume being different.

The gas turbine engine of any preceding clause, wherein a number of cavity volumes of the multicavity damper is directly proportional to a number of target frequencies.

The gas turbine engine of any preceding clause, wherein each of the first cavity volume and the second cavity volume has a length that is equal to the main damper cavity.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gas turbine engine comprising:
   a compressor section for compressing air flowing therethrough to provide a compressed air flow;
   a combustor including a combustion chamber, the combustion chamber configured to combust a mixture of a fuel flow and the compressed air flow to generate combustion products, the combustion products producing an instability in the combustion chamber, the instability having at least one frequency;
   a turbine section having at least one turbine driven by the combustion products; and
   a multicavity damper in fluid communication with the combustion chamber to damp the instability generated by the combustion products in the combustion chamber, the multicavity damper including:

a bottom surface fluidly connected to the combustion chamber;

a top surface opposite the bottom surface;

a cylindrical surface extending from the bottom surface to the top surface in an axial direction, the bottom surface, the top surface, and the cylindrical surface defining a main damper cavity;

a first inner wall positioned in the main damper cavity extending in the axial direction from the bottom surface, the top surface, or both the bottom surface and the top surface; and a second inner wall positioned in the main damper cavity between the bottom surface and the top surface, and extending from the first inner wall to the cylindrical surface, the first inner wall and the second inner wall dividing the main damper cavity into a plurality of differing cavity volumes, each differing cavity volume having a unique length to target a unique instability frequency.

2. The gas turbine engine of claim 1, wherein each of the plurality of cavity volumes is fluidly isolated from each other within the multicavity damper.

3. The gas turbine engine of claim 1, wherein the length of each cavity volume is less than twenty percent different from one another.

4. The gas turbine engine of claim 1, wherein the length of each cavity volume is greater than twenty percent different from one another.

5. The gas turbine engine of claim 1, wherein the length of a first cavity volume is less than twenty percent different from a length of a second cavity volume, and the length of the first cavity volume is greater than twenty percent different from a length of a third cavity volume.

6. The gas turbine engine of claim 1, wherein the length of a first cavity volume is less than twenty percent different from a length of a second cavity volume, and the length of the second cavity volume is greater than twenty percent different from a length of a third cavity volume.

7. The gas turbine engine of claim 1, wherein a number of cavity volumes of the multicavity damper is directly proportional to a number of target frequencies.

8. The gas turbine engine of claim 1, wherein the multicavity damper is coupled to an outer liner of the combustor through a single opening in the outer liner.

9. The gas turbine engine of claim 8, wherein the multicavity damper is one of a plurality of multicavity dampers disposed circumferentially about the combustor.

10. The gas turbine engine of claim 1, wherein the plurality of cavity volumes comprises a first cavity volume having a first cavity volume length and a second cavity volume having a second cavity volume length.

11. The gas turbine engine of claim 10, wherein the first cavity volume damps a first target frequency and the second cavity volume damps a second target frequency, wherein the first target frequency is different than the second target frequency.

12. The gas turbine engine of claim 11, wherein the first cavity volume length is less than twenty percent different than the second cavity volume length such that an attenuation curve of the multicavity damper comprises two frequency curves with distinct frequency peaks, the two frequency curves merging to provide a broadened damping frequency band.

13. The gas turbine engine of claim 11, wherein the first cavity volume length is greater than twenty percent different than the second cavity volume length such that an attenuation curve of the multicavity damper comprises two frequency curves with distinct frequency peaks, the two frequency curves being distinct and separate with no blending of the frequency curves.

14. The gas turbine engine of claim 11, further comprising a third cavity volume having a third cavity volume length, wherein the third cavity volume damps a third target frequency that is different from the first target frequency and the second target frequency.

15. The gas turbine engine of claim 1, wherein a first cavity volume has a length that is less than a length of the main damper cavity and a second cavity volume has a length that is greater than a length of the main damper cavity.

16. The gas turbine engine of claim 1, further comprising a third inner wall extending parallel to the first inner wall and a fourth inner wall extending parallel to the second inner wall, wherein the main damper cavity comprises a third cavity volume defined between each of the first inner wall, the second inner wall, the third inner wall, and the fourth inner wall.

17. The gas turbine engine of claim 1, further comprising at least one opening arranged on the bottom surface to fluidly connect the at least one of the plurality of cavity volumes to the combustion chamber.

18. The gas turbine engine of claim 1, further comprising at least one opening arranged on the cylindrical surface to fluidly connect the at least one of the plurality of cavity volumes to an outer passage of the combustor.

19. The gas turbine engine of claim 1, further comprising a first damper body portion and a second damper body portion capable of being fastened together to form a body of the multicavity damper.

\* \* \* \* \*